(12) United States Patent
Kryukov

(10) Patent No.: US 12,060,228 B2
(45) Date of Patent: Aug. 13, 2024

(54) PRODUCT DISTRIBUTION UNIT AND AUTOMATED PRODUCT RECOGNITION SYSTEM

(71) Applicant: Pavel Nikolaevich Kryukov, Shelehov (RU)

(72) Inventor: Pavel Nikolaevich Kryukov, Shelehov (RU)

( * ) Notice: Subject to any disclaimer, the term of this patent is extended or adjusted under 35 U.S.C. 154(b) by 0 days.

(21) Appl. No.: 18/496,578

(22) Filed: Oct. 27, 2023

(65) Prior Publication Data

US 2024/0051756 A1 Feb. 15, 2024

Related U.S. Application Data

(63) Continuation of application No. PCT/RU2022/000161, filed on May 16, 2022.

(30) Foreign Application Priority Data

Sep. 2, 2021 (RU) .......................... RU2021125921

(51) Int. Cl.
*B65G 47/46* (2006.01)
*B65G 1/137* (2006.01)
(Continued)

(52) U.S. Cl.
CPC .......... *B65G 1/1376* (2013.01); *B65G 47/841* (2013.01)

(58) Field of Classification Search
CPC ...... B65G 1/1376; B65G 15/12; B65G 43/08; B65G 47/46; B65G 47/841; A47F 9/04
(Continued)

(56) References Cited

U.S. PATENT DOCUMENTS 4,711,357 A * 12/1987 Langenbeck ........ B65G 47/766
209/652
5,655,643 A * 8/1997 Bonnet ................ B65G 47/766
198/370.08
(Continued)

FOREIGN PATENT DOCUMENTS

WO 2009103410 A1 8/2009

OTHER PUBLICATIONS

International Search Report for PCT/RU2022/000161 mailed Sep. 1, 2022, 3 pages.
(Continued)

*Primary Examiner* — Douglas A Hess
(74) *Attorney, Agent, or Firm* — Nixon & Vanderhye PC

(57) ABSTRACT

A conveyor unit distributes products and an automated product and item recognition system use such a unit. The technology is usable in customer self-service checkouts, as well as in automated warehouses for sorting products. The distribution unit includes at least one horizontal conveyor to move products to the recognition unit, at least two vertical conveyors placed above at least one horizontal conveyor and oriented at an angle to the movement axis of the horizontal conveyor, and at least one sensor to identify the position of products on conveyors. The horizontal and vertical conveyors are designed to enable the independent adjustment of the conveyor speed based on the readings received from at least one sensor. The approach provides improved accuracy and performance for automated recognition of products with different shapes, weights, or sizes and simplified use of the automated system without any need for the placement of products in sequence.

18 Claims, 4 Drawing Sheets

(51) Int. Cl.
*B65G 47/84* (2006.01)
*B65G 15/12* (2006.01)

(58) Field of Classification Search
USPC ........................................... 198/347.1
See application file for complete search history.

(56) References Cited

U.S. PATENT DOCUMENTS

| | | | | |
|---|---|---|---|---|
| 6,189,702 | B1 * | 2/2001 | Bonnet | B65G 47/82 |
| | | | | 198/748 |
| 7,124,876 | B2 * | 10/2006 | Wolf | B65G 21/06 |
| | | | | 198/370.1 |
| 7,963,385 | B2 * | 6/2011 | Sng | B65G 47/766 |
| | | | | 198/367.1 |
| 9,902,567 | B1 * | 2/2018 | Zimmer | B65G 47/766 |
| 10,471,478 | B2 * | 11/2019 | Gil | B65G 15/30 |
| 2009/0114508 | A1 | 5/2009 | Hara et al. | |
| 2011/0220458 | A1 | 9/2011 | Sng et al. | |
| 2020/0115170 | A1 | 4/2020 | Carpenter | |

OTHER PUBLICATIONS

Written Opinion of the ISA for PCT/RU2022/000161 mailed Sep. 1, 2022, 4 pages.

* cited by examiner

PRODUCT DISTRIBUTION UNIT AND AUTOMATED PRODUCT RECOGNITION SYSTEM

CROSS-REFERENCE TO RELATED APPLICATIONS

This application is the U.S. continuation of International Application No. PCT/RU2022/000161 filed May 16, 2022 which designated the U.S. and claims priority to RU 2021125921 filed Sep. 2, 2021, the entire contents of each of which are hereby incorporated by reference.

FIELD OF THE INVENTION

The group of inventions refers to a conveyor unit for distributing products within a product flow and an automated product (item) recognition system using such unit. These inventions can be used in customer self-service checkouts, as well as in automated warehouses for sorting products.

PRIOR ART

Self-service checkouts often use an automated system for scanning (recognizing) products without direct involvement of the customer. In such systems, the customer only places the products on the checkout belt, and they are moved to the scanning area, where they are automatically recognized by the identification module based on one or more principles, such as measuring the product weight, scanning a graphic code or RFID tag, recognizing shape or texture, etc.

The main problem of such systems consists in their frequent recognition errors when multiple products are detected in the scanning area at the same time. This problem is particularly common when recognizing multiple items of different shapes, weights, or sizes. To reduce such errors, the customer or store employee has to place the products on the checkout belt in sequence, one after another, at certain intervals, which is inconvenient and slows down the checkout counter operation.

Therefore, in the automated recognition systems, there is a need to use additional equipment for distributing the products in a moving product flow in order to separate the products, which are too close to each other, and line them up at pre-defined intervals so that they can be moved into the recognition area.

Application No. US2009114508 dd. May 7, 2009, described a product distribution unit that comprises an input conveyor, an output conveyor with a position sensor and one or more leveling conveyors, which are located between them and operated by a control unit. In the known design, all conveyors are arranged in sequence, one after another, which only allows to achieve the required distance between the sequentially pre-arranged products by adjusting the conveyor speed. Therefore, known system cannot be used to separate and subsequently recognize the items randomly placed on the input conveyor.

The closest analog of the claimed group of inventions is the product distribution unit disclosed in the patent CN207090420, dd. Mar. 13, 2018, published in China. This unit is also designed to provide an orderly flow of products at specific intervals and includes the main horizontal conveyor and three vertical conveyors installed on the said horizontal conveyor. The planes of vertical conveyors are at an angle to the axis of the horizontal conveyor movement. In the known design, the products move along the horizontal conveyor and reach the vertical conveyors, which are located on the sides and push the products from such sides of the horizontal conveyor closer to its center to align them in a single line. Nevertheless, the known analog fails to address the problem of distributing a large number of randomly placed products of different shapes and sizes, as it cannot independently control the speed of each conveyor.

DISCLOSURE OF INVENTION

The main technical problem that the discussed group of inventions aims to address is the inability to automatically recognize the products that have different weights, shapes, or sizes, and are randomly provided to the system.

The technical result of this group of inventions is the improved accuracy and performance for automated recognition of products with different shapes, weights, or sizes and simplified use of the automated system without any need for placing the products in sequence.

In the distribution unit of automated product recognition system, the said technical result is achieved by including the following in the unit: At least one horizontal conveyor for moving products to the recognition unit; at least two vertical conveyors placed above at least one horizontal conveyor at an angle to the axis of horizontal conveyor movement; and at least one sensor to identify the position of products on the conveyors. Moreover, the horizontal and vertical conveyors are designed to enable the independent adjustment of the conveyor speed based on the readings received from at least one sensor.

In the specific embodiments of the distribution unit, the said technical result is also achieved by the following:

The unit includes multiple horizontal conveyors, some of which are designed to move the products towards the recognition unit, while others can move them crosswise to that direction;

Each vertical conveyor adjoins a side of the horizontal conveyor;

Vertical conveyors are arranged at an angle of 1-90° to the axis of horizontal conveyor movement;

Horizontal and vertical conveyors are belt conveyors;

Vertical conveyors have protruding ribs for contact with products,

The unit includes the following components arranged in sequence: First horizontal conveyor designed to enable the product movement towards the recognition unit and first vertical conveyor located above the first horizontal conveyor; second horizontal conveyor designed to enable the product movement crosswise to the direction leading towards the recognition unit, and second vertical conveyor located above the second horizontal conveyor; third horizontal conveyor designed to enable the product movement towards the recognition unit, and third vertical conveyor located above the third horizontal conveyor; and fourth horizontal conveyor designed to enable the product movement towards the recognition unit and back; the unit also includes the first, second, third and fourth sensors to identify the position of products placed at the ends of the vertical conveyors;

Fourth horizontal conveyor is combined with the tray for receiving unidentified products and has a distribution divider for moving unidentified products into the said tray;

First vertical conveyor is located at an angle of 55-85° to the movement axis of the first horizontal conveyor, the second vertical conveyor is located at an angle of 55-85° to the movement axis of the second horizontal conveyor, and the third vertical conveyor is located at an angle of 55-85° to the movement axis of the third horizontal conveyor.

In the automated product recognition system, the said technical result is achieved by the use of product distribution unit designed as described above, a product recognition unit with a product identification module, as well as a control unit connected to the horizontal and vertical conveyors, and at least one sensor to identify the position of products, and the identification module.

In addition, the specific embodiments of the product recognition system include the following:
- In the recognition unit, the product identification module contains at least one recognition tool selected from the group which includes a weight sensor, graphic code scanner, RFID scanner, infrared sensor, video camera, and an image camera;
- Product identification module has a horizontal conveyor of the identification module designed to enable reverse movement of products in the identification module;
- Additional horizontal distribution conveyor located behind the horizontal conveyor of the identification module and designed to enable reverse movement of products and equipped with a distribution divider to distribute the products between the receiving trays;
- Sensors placed in the start and end areas of the horizontal conveyor of the identification module can identify the position of products; In this group of inventions, the mutual arrangement of horizontal and vertical conveyors, along with the separate control of their speed based on sensor readings of the product position, enables a high degree of separation and alignment for the products of any shape, weight, or size before such products can reach the identification module of the recognition unit. This improves the accuracy of product identification while ensuring high performance of the system. At the same time, the user/customer is not required to place the products/items on the conveyor in sequence.

These benefits provide the following for the self-service checkout counters:
a) Making the checkout counter more user-friendly by eliminating the requirement for each product to be placed in sequence by the customer.
b) Improving the performance of the checkout counter by adjusting the speed of conveyors, which allows to increase the speed of corresponding conveyors when the distance is greater than required for the product identification.
c) Reducing the likelihood of incorrect product identification caused by the customer's failure to properly place each product in sequence on the loading conveyor.

BRIEF DESCRIPTION OF DRAWINGS

The invention is explained with Figures where.

The items on the Figures are designated as follows:
1—distribution unit,
2—recognition unit;
3—horizontal conveyor;
301—first horizontal conveyor;
302—second horizontal conveyor;
303—third horizontal conveyor;
304—fourth horizontal conveyor;
4—vertical conveyor;
401—first vertical conveyor;
402—second vertical conveyor;
403—third vertical conveyor;
5—product position sensor;
501—first product position sensor;
502—second product position sensor;
503—third product position sensor;
504—fourth product position sensor;
505—fifth product position sensor;
506—sixth product position sensor;
6—receiving tray for unidentified products;
7—product identification module;
8—fifth horizontal conveyor (identification module conveyor);
9—sixth horizontal conveyor (distribution conveyor);
10, 11—output receiving trays;
12—distribution divider of the fourth horizontal conveyor;
13—distribution divider of the sixth horizontal conveyor;
14—inclined section of the receiving tray for unidentified products;
15—inclined section of the output receiving trays;
16—product.

EMBODIMENT OF THE INVENTION

In this application, a "product" means any object or item that can be moved on a conveyor. "Distribution" means the process of separating the products in the moving product flow to arrange them at a certain interval.

The claimed automated product recognition system includes a product distribution unit (1) and a product recognition unit (2).

Figure 1:
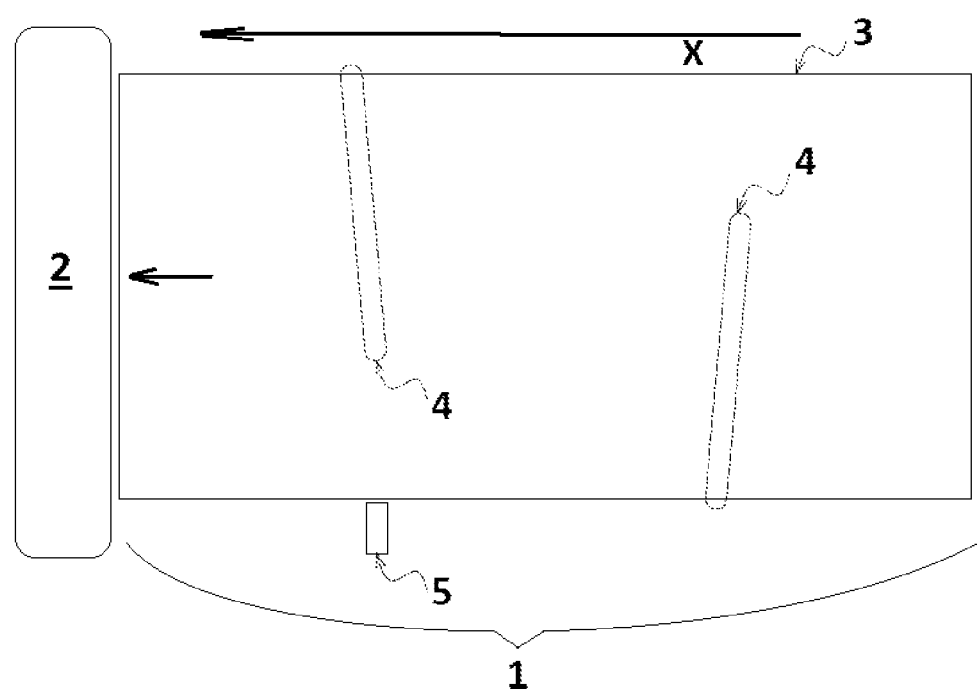
FIG. 1 shows a diagram describing the basic embodiment of the product distribution system.

In the basic embodiment (see FIG. 1), the distribution unit (1) includes at least one horizontal conveyor (3) to move products to the recognition unit (2), at least two vertical conveyors (4) placed above the horizontal conveyor (3) to adjust the position of products on the horizontal conveyor (3), and at least one sensor (4) to identify the position of products on conveyors (3, 4).

When using multiple horizontal conveyors (301, 302, 303, 304, 305), some (301, 303, 304, 305) of them can move products towards (X) the recognition unit (2), while the others (302)—crosswise to that direction (X). One or more horizontal conveyors (304) can be designed to allow reverse movement.

The vertical conveyors (4) are designed to change the trajectory of product movement on the horizontal conveyor(s) (3) by being positioned at an angle to the movement axis. Such angle may range from 1° to 90° depending on the configuration and location of the conveyors and their operation settings. The vertical conveyors (4) are adjacent to a side of the horizontal conveyor (3). In their various design embodiments, different vertical conveyors (4) may be adjacent to one side of horizontal conveyors (3) (see FIG. 2) and to their different sides (see FIG. 1).

Preferably, these conveyors (3, 4) are belt conveyors, but they may have other design, as well. The belts of all vertical conveyors (2) preferably have an uneven surface (for example, in the form of ribs) to improve adhesion to moving products (items).

All horizontal (3) and vertical conveyors (4) are designed to allow separate speed control (independent control for each conveyor) based on the readings received from at least one position sensor (5). In particular, the speed may be adjusted in the range of 0-3 M/sec. The operation of conveyors, sensors, and recognition unit (3) is controlled by the control unit (on shown on the Figures). The configuration of such units is widely known to the experts and, therefore, is not described in this application.

The product position sensor (5) can have any configuration and use any known principle (image, video, infrared, electromagnetic, etc.) to identify the position of the products.

The recognition unit (2) includes a product identification module (7) and may additionally include one or more horizontal conveyors (8, 9) for moving products through the recognition unit and sorting them.

The product identification module (7) can have any configuration known to the experts and contain one or more recognition tools, including weight sensors, graphic code scanners, RFID scanners, infrared sensors, magnetic sensors, video cameras, image cameras, etc. In its specific embodiment, the identification module (7) can be provided in the form of a scanning tunnel equipped with a conveyor (8) for moving pre-positioned products.

Figure 2:
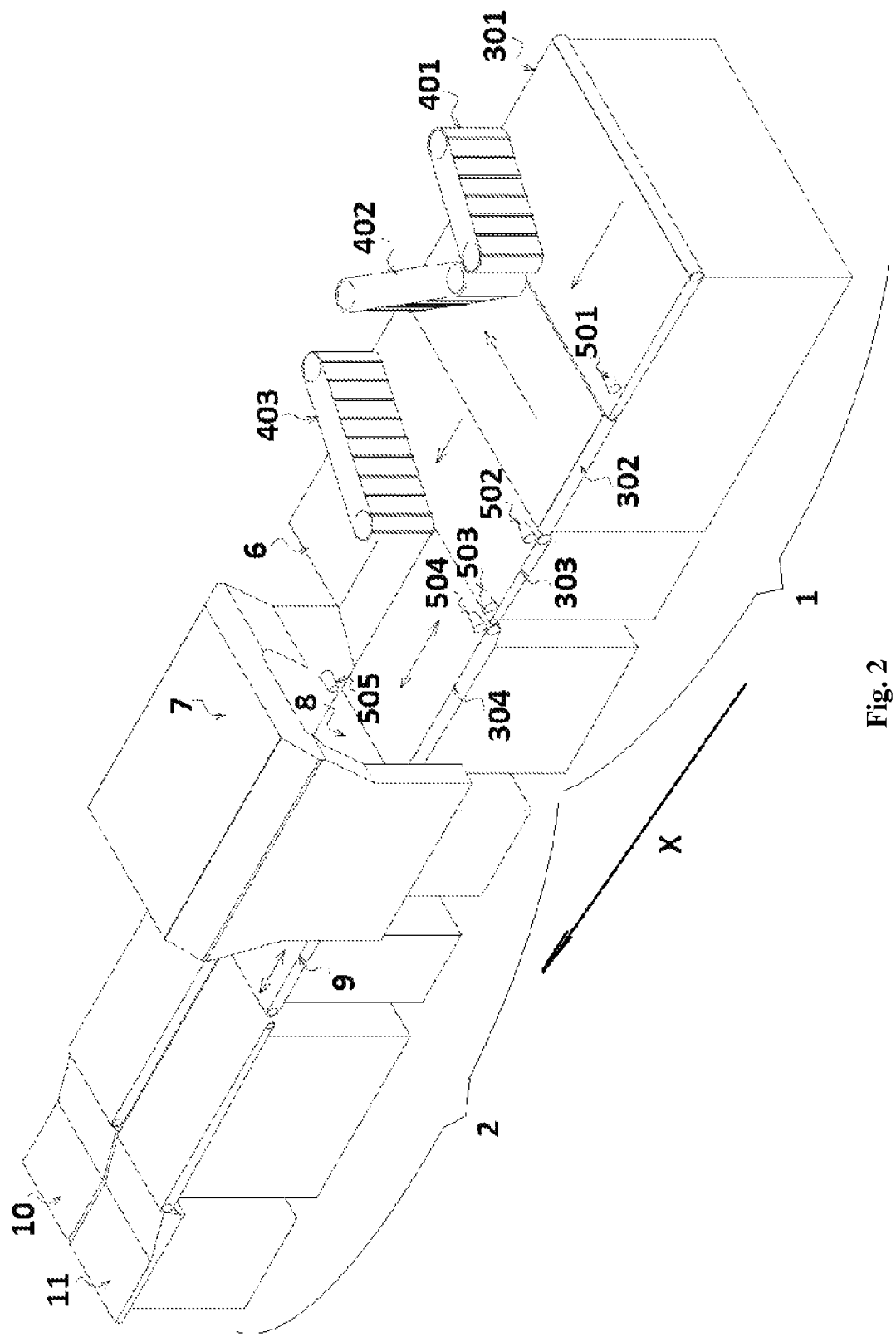
FIG. 2 shows a design describing the preferred embodiment of the product distribution system.

The following describes the preferred embodiment of the product recognition system according to the claimed group of inventions (see FIG. 2). Such system includes a distribution unit (1) with five horizontal belt conveyors (301, 302, 303, 304, 305), three vertical belt conveyors (401, 402, 403), four product position sensors (501, 502, 503, 504) and a receiving tray (6) for unidentified products; and a recognition unit (2) with the identification module (7), two horizontal conveyors (8, 9), two product position sensors (505, 506) and two output trays (10, 11) for receiving recognized products.

The first horizontal conveyor (301) is designed for randomly placing products (16) (items). This conveyor (301) allows to move products in the direction (X) towards the recognition unit (2). Above the first (loading) horizontal conveyor (301), there is the first vertical belt conveyor (401) placed in the corner of the conveyor (401), preferably, at an angle of 55°-85° (and most preferably, at an angle of 80°) relative to the movement direction of the first horizontal conveyor (301).

Figure 3:
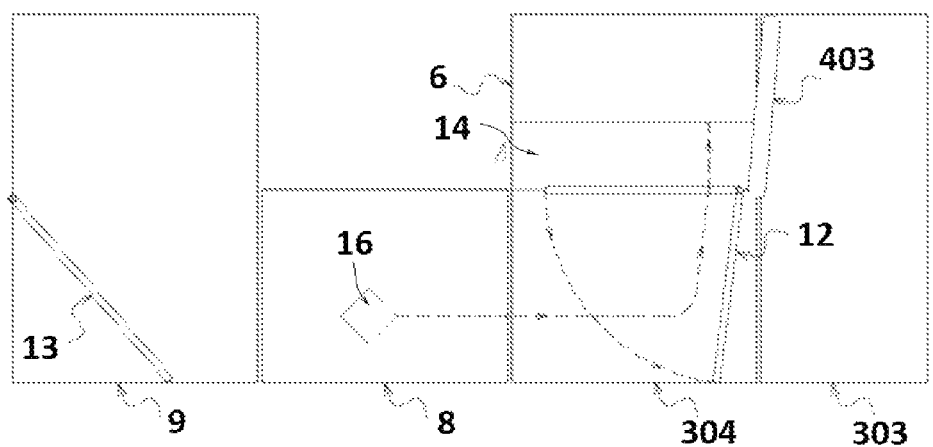
FIG. 3 shows a diagram describing the return of unidentified products to the receiving tray.

The second horizontal conveyor (302) is placed behind the first one (301) and allows to move products perpendicularly to the direction (X). Above the second horizontal conveyor, there is the second vertical conveyor (402) adjacent to the first vertical conveyor (401). The conveyor (402) is preferably positioned at an angle of 55-85° (and most preferably, at an angle of 80°) relative to the movement direction of the second horizontal conveyor (302);

The third horizontal conveyor (303) is placed behind the second one (302) and allows to move products in the direction (X). Above the third horizontal conveyor (303), in its corner, there is the third vertical separation conveyor (403) at an angle of 55-85° (and most preferably, at an angle of 80°) relative to the movement direction of the third horizontal conveyor (303). The fourth horizontal conveyor (304) is placed sequentially behind the third conveyor (303) and has the same direction of conveyor belt movement (X) towards the recognition unit (2). The fourth horizontal conveyor (304) is designed to allow the reverse movement of the belt to return the products to the receiving tray (6), if the identified product fails to meet any criterion in the database. The receiving tray (6) is combined with the fourth horizontal conveyor (304) through an inclined section (14) and the product can be returned to the fourth horizontal conveyor using a vertical distribution divider (12) (see FIG. 3), which can pivot about one of its ends and close the passage between the fourth (304) and third (303) horizontal conveyors. The product comes in contact with the said divider (12) and rolls into the receiving tray (6).

The fifth horizontal conveyor (conveyor of the identification module) (8) is placed behind the fourth horizontal conveyor (301) and passes through the identification module (7). This conveyor (8) allows the reverse movement along the direction (X) and can also serve as the dynamic scales.

Figure 4:
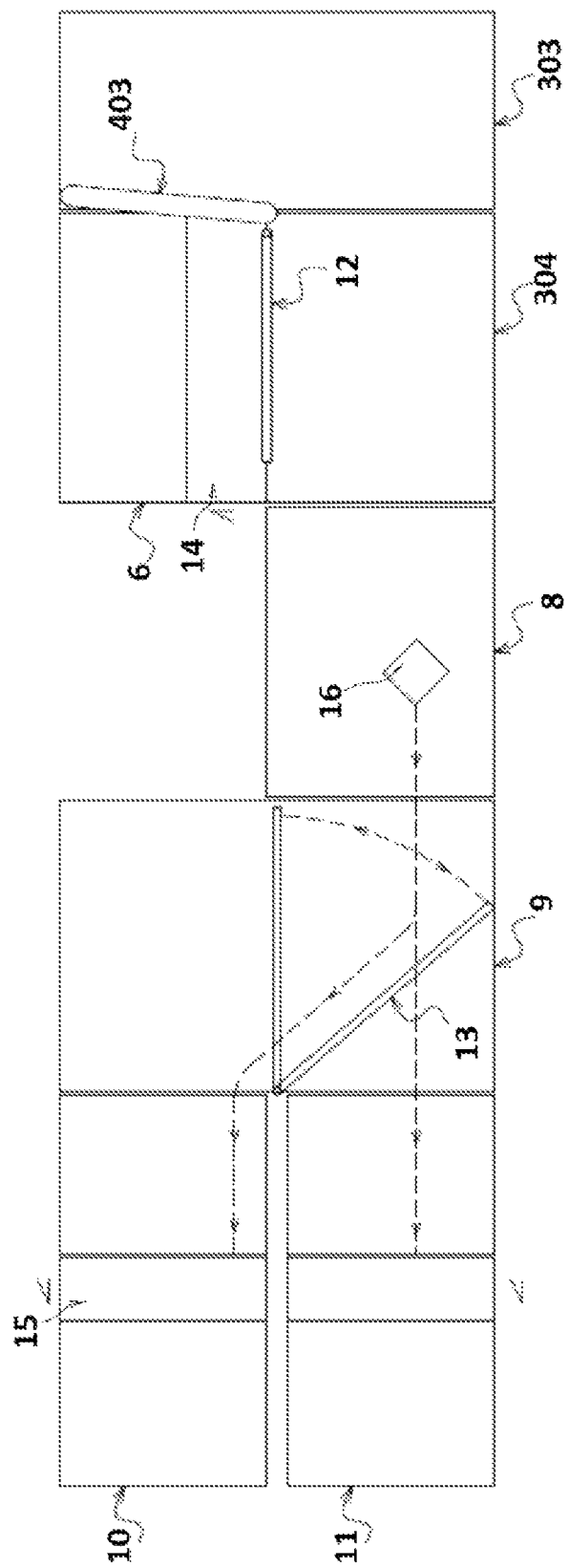
FIG. 4 shows a diagram describing the distribution of products to the output receiving trays.

The sixth horizontal conveyor (horizontal distribution conveyor) (9) is placed behind the fifth one (8) and allows the reverse movement along the direction (X). The said conveyor (9) has a vertical distribution divider (13) (see FIG. 4) that can rotate within a given range around the axis at one of its ends, which allows to distribute the identified products across two receiving output trays (10, 11) that have an inclined section (15).

The first (501), second (502), third (503), and fourth (504) sensors, which detect whether the product is present in the sensor area, are installed opposite to the ends of each vertical conveyor (401, 402, 403). The fifth (505) sensor, which detects the presence of products and allows calculating the distance between products to control the conveyor speed, is installed between the fourth (304) and fifth (8) horizontal conveyors (304). The sixth sensor (306) designed to ensure the correct operation of the sixth horizontal conveyor (9) as dynamic scales is installed between the fifth (8) and sixth (9) horizontal conveyors. If the product (16) is, at the same time, placed on the fifth and sixth horizontal conveyors, the product located on the fifth conveyor will not be measured for its weight until the area between the fifth and sixth conveyors is cleared.

In its basic embodiment (see FIG. 1), the claimed recognition system operates as follows.

The user randomly places the products (items) on the horizontal conveyor. The products are moved by the horizontal conveyor in the direction (X) towards the recognition unit (2) and reach the next vertical conveyor (4), which is located crosswise to the horizontal one (3) and moves the products form the left side of the horizontal conveyor to its center by arranging this part of the products in a line. Then, the products reach the distant vertical conveyor (4), which moves the products from the right side of the horizontal conveyor (3) closer to its center by arranging the other part of the products in a line. At the same time, the control unit uses the sensor (5) to monitor the quantity of products (items) arriving from the distant vertical conveyor and, when needed, changes the speed of conveyors (3, 4) by slowing down or accelerating them so that the products arrive to the recognition unit (2) evenly and at a certain interval. The recognition unit (2) identifies each product by one or more attributes (weight, shape, texture, graphic code, RFID tag, etc.) for their subsequent sale to the customer or sorting and further storage.

The testing revealed that, in the basic embodiment of the system with one horizontal and two vertical conveyors, the accuracy of recognition for randomly placed products of different size, weight and shape is about 67%. Even though this accuracy rate is not very high, it is significantly higher than for the nearest analog, where the products are distributed without considering the data on the product location. At the same time, such basic embodiment improves the performance of product processing.

In its preferred embodiment, the claimed recognition system (see FIG. 2) operates as follows in case of a self-service checkout counter.

The customer randomly (not in sequence) places the products (items) on the first (loading) horizontal conveyor.

The products placed in the right side (relative to the movement direction) of the conveyor (301) reach the first vertical conveyor (401) and move at a certain speed from the side of the conveyor (401) closer to its center, taking based on the readings received from the first sensor (501). Other products are moved by the conveyor (301) in the direction (X).

Next, when the products placed in the left side (relative to the movement direction) reach the second horizontal conveyor (302), they are moved by the conveyor (302) perpendicularly to the direction (X) and closer to the center, while the products on the right side are moved by the second vertical conveyor (402) diagonally to the right side at a certain speed based on the readings received from the first sensor (501) and second sensor (502).

Then the products are moved to the third horizontal conveyor (303), where they are again moved in the direction (X) and reach the third vertical conveyor (403), which arranges the products in a line based on the readings received from the third and fourth sensors (503, 504).

After that, the products arranged in a line are moved, one by one and at a certain interval, on the fourth conveyor based on the readings received from the fifth sensor (505) to the fifth vertical conveyor (8) (dynamic scales) of the identification module (7), where the products are identified by any of the method using digital computers, scanners, appearance and/or barcodes, and/or RFID tags. If a product cannot be identified for any reason, the divider (12) is moved to the position at an angle of 55-85° relative to the movement direction of the conveyor (304), and the reverse movement (which is opposite to the direction "X") is activated for conveyors (9), (8), (304), and the product (16) is moved to the divider (12), reaches it and is dumped into the receiving tray (6).

When a product (16) is successfully identified in the module (9), it continues to be moved towards the conveyor (9), which has a distribution divider (13) installed above. The initial position of the divider (13) is at an angle of 55-85° to the movement direction of the conveyor (9). As one part of products (16) moves on the conveyor (9), such products reach the divider (13) and are shifted to the right relative to the movement direction towards the output receiving tray (10). The other part of products (16), such as those of the next customer, is moved to the output receiving tray (11), while the divider (13) changes its position to align with the movement direction of the conveyor (9). Then the customer may collect the scanned products and pay for them.

The testing revealed that, in the preferred embodiment of the system, the accuracy rate of product recognition is more than 99% due to the high level of product separation.

The invention claimed is:

1. A distribution unit for an automated product recognition system, comprising:
   at least one horizontal conveyor configured to move products to a recognition unit along a first movement axis;
   at least two vertical conveyors located above the at least one horizontal conveyor at an angle relative to the first movement axis of the horizontal conveyor;
   at least one sensor configured to identify positions of products on the at least one horizontal conveyor and on the at least two vertical conveyors,
   wherein the at least one horizontal conveyor and the at least two vertical conveyors are arranged to enable independent adjustment of their speeds based on readings received from the at least one sensor.

2. The unit according to claim 1, wherein the at least one horizontal conveyor comprises multiple horizontal conveyors, a first set of the multiple horizontal conveyors being arranged to move the products in a first direction towards the recognition unit, and a second set of the multiple horizontal conveyors being arranged to move the products in a second direction transverse to the first direction.

3. The unit according to claim 1, wherein each of the vertical conveyors adjoins a side of the at least one horizontal conveyor.

4. The unit according to claim 1, wherein each of the vertical conveyors is arranged at an angle of 1°-90° relative to the first movement axis.

5. The unit according to claim 1, wherein the horizontal and vertical conveyors are belt conveyors.

6. The unit according to claim 1, wherein the at least two vertical conveyors have protruding ribs arranged to contact the products.

7. The unit according to claim 1, wherein:
   the at least two vertical conveyors comprises first, second, and third vertical conveyors,
   the at least one horizontal conveyor comprises first, second, third, and fourth horizontal conveyors, located in this sequence,
   the first horizontal conveyor is arranged to enable the products to move in a first direction towards the recognition unit, the first vertical conveyor being located above the first horizontal conveyor,
   the second horizontal conveyor is arranged to enable the products to move in a second direction transverse to the first direction, the second vertical conveyor being located above the second horizontal conveyor,
   the third horizontal conveyor is arranged to enable the products to move in the first direction, the third vertical conveyor being located above the third horizontal conveyor,
   the fourth horizontal conveyor is arranged to enable the products to move in the first direction and in a third direction opposite to the first direction, and
   wherein the at least one sensor comprises first, second, third, and fourth sensors, configured to identify the positions of the products, the first through fourth sensors being located in end areas of the vertical conveyors.

8. The unit according to claim 7, wherein the fourth horizontal conveyor has a receiving tray for unidentified products and a distribution divider for moving unidentified products to the receiving tray.

9. The unit according to claim 7, wherein the first vertical conveyor is located at an angle of 55-85° relative to a movement axis of the first horizontal conveyor, the second vertical conveyor is located at an angle of 55-85° relative to a movement axis of the second horizontal conveyor, and the third vertical conveyor is located at an angle of 55-85° relative to a movement axis of the third horizontal conveyor.

10. An automated product recognition system, comprising the distribution unit according to claim 1, the product recognition unit, a controller connected to the horizontal and vertical conveyors, the at least one sensor, and a product identification module.

11. The system according to claim 10, wherein the product recognition unit includes the product identification module, the product recognition unit including at least one recognition tool selected from the group consisting of: a weight sensor, a graphic code scanner, an RFID scanner, an infrared sensor, a video camera, and an image camera.

12. The system according to claim 10, wherein the product identification module has a horizontal conveyor designed to enable reverse movement of the products therein.

13. The system according to claim 12, further comprising an additional horizontal distribution conveyor located behind the horizontal conveyor equipped with a distribution divider configured to distribute the products between receiving trays.

14. The system according to claim 12, wherein the at least one sensor are located in start and end areas of the horizontal conveyor of the product identification module and are configured to identify the position of the products.

15. The unit according to claim 1, further comprising a connection to a product identification module having a horizontal conveyor designed to enable reverse movement of the products therein.

16. The unit according to claim 1, wherein the speed of each conveyor is independently controllable to provide a controlled distribution of products of different weights, sizes, and shapes.

17. The unit according to claim 1, further comprising a controller operably connected to the at least one sensor, the at least one sensor being configured to sense weights, sizes, and shapes of different products provided to the unit, the controller being configured to control the speed of each conveyor, independently, based on output from the at least one sensor.

18. The unit according to claim 1, wherein the at least two vertical conveyors are mounted above the at least one horizontal conveyor so that the at least two vertical conveyors selectively contact products placed on the at least one horizontal conveyor to arrange those products in a line with a predetermined spacing therebetween.

* * * * *